(12) United States Patent
Strauser

(10) Patent No.: US 8,897,693 B1
(45) Date of Patent: *Nov. 25, 2014

(54) KARAOKE DEVICE WITH INTEGRATED MIXING, ECHO AND VOLUME CONTROL

(75) Inventor: Jack Strauser, Pinellas Park, FL (US)

(73) Assignee: Dok Solution LLC, Largo, FL (US)

( * ) Notice: Subject to any disclaimer, the term of this patent is extended or adjusted under 35 U.S.C. 154(b) by 220 days.

This patent is subject to a terminal disclaimer.

(21) Appl. No.: 13/418,690

(22) Filed: Mar. 13, 2012

Related U.S. Application Data

(63) Continuation of application No. 11/672,784, filed on Feb. 8, 2007, now Pat. No. 8,160,489, which is a continuation-in-part of application No. 11/469,654, filed on Sep. 1, 2006, now abandoned.

(51) Int. Cl.
*G09B 5/00* (2006.01)
(52) U.S. Cl.
USPC .............. 434/307 A; 84/610; 84/634; 84/631; 381/119
(58) Field of Classification Search
CPC . G10H 1/361; G10H 1/368; G10H 2210/091; G10H 2220/011; G10H 2240/211; G10H 15/00; G10H 5/04
USPC .......... 434/307 A; 84/610, 634, 631; 381/119
See application file for complete search history.

(56) References Cited

U.S. PATENT DOCUMENTS

| 3,643,046 | A |   | 2/1972 | Zdanys et al. |
| 3,975,583 | A | * | 8/1976 | Meadows ...................... 348/460 |
| 5,773,744 | A | * | 6/1998 | Nagata ............................ 84/610 |
| 6,127,618 | A |   | 10/2000 | Sugiyama |
| 6,267,600 | B1 |   | 7/2001 | Song |
| 6,514,083 | B1 |   | 2/2003 | Kumar et al. |
| 2004/0094018 | A1 |   | 5/2004 | Ueshima et al. |

OTHER PUBLICATIONS

Emerson, "Dual Plug N Sing Handheld Karaoke Microphones", Sep. 1, 2004, www.google.com, pp. 1-6.*

* cited by examiner

*Primary Examiner* — Jack Yip
(74) *Attorney, Agent, or Firm* — Larson & Larson, P.A.; Frank Liebenow; Justin P. Miller

(57) ABSTRACT

A karaoke device is housed within an enclosure. A voice pickup element is integrated into the enclosure. The voice pickup element converts sound waves into an electrical signal. The karaoke device has an audio input and an audio output. An amplifier housed within the enclosure variably amplifies the electrical signal from the voice pickup element. A mixer, also within the enclosure, has a first input connected to an output of the amplifier and a second input connected to the audio input. A switch is include and has at least two positions. A first position of the switch connects the audio input to the audio output and a second position of the switch connects an output of the mixer to the audio output.

8 Claims, 4 Drawing Sheets

KARAOKE DEVICE WITH INTEGRATED MIXING, ECHO AND VOLUME CONTROL

RELATED APPLICATIONS

This application is a continuation-in-part of co-pending application Ser. No. 11/672,784 filed Feb. 8, 2007 which in turn is a continuation-in-part of application Ser. No. 11/469,654 filed Sep. 1, 2006, now abandoned.

BACKGROUND OF THE INVENTION

This invention relates to a karaoke device and more particularly to a karaoke device that works with an existing content source and output device such as a DVD player and television.

Karaoke devices are well known in the industry. Generally, these devices include a source of music and lyrics that are played and displayed while the user(s) sing along. Early karaoke devices included a magnetic tape or compact disc with music recorded thereon. The music recorded is without vocal sound track or the vocal track is significantly muted so that the user can sing along with the music.

A professional karaoke system includes a source of music and lyrics, one or more microphones, a sound processing/amplification system for enhancing the user's voice and a display system for displaying lyrics and cues for the user(s). Some sound processing and amplification systems include circuitry for adding echo to the user's voice and possibly additional circuitry to enhance the user's voice. It may also include a mixer for mixing the sound track with the user's voice. The display system is for displaying video information about the music, lyrics and a cue (e.g., color changes of lyrics) to help keep the user's singing on track with the music.

Home karaoke players have become popular in recent years. These systems include a player that accepts a microphone input and a karaoke disc or tape and mixes the user's voice with music from the disc, amplifies the sound and reproduces the sound with a speaker. One such system is described in U.S. Pat. No. 5,951,302 to Decker. There are several drawbacks to karaoke systems as described. The first drawback relates to having a separate device that duplicates many of the functions that are already performed by other components often found in homes and business. Many users already have a device that is capable of playing karaoke tapes or disks; for example, a CD player or DVD player. These users often have another device for amplifying and reproducing the music; for example, a stereo system or television. These users often have a device for displaying the lyrics and cues; for example, a television. Therefore, having another device that replicates many of these functions is wasteful and increases clutter. Another drawback to these types of systems is that the controls are often on the device, not the microphone. Being such, the user must approach the device with the microphone to adjust the volume, echo, etc, often causing undesirable feedback and noise. A third drawback is the requirement for a wire from the microphone to the karaoke device.

What is needed is a karaoke device that interfaces with a standard home music/video source and television with minimal cabling and provides all effects and controls within the karaoke device.

SUMMARY OF THE INVENTION

In one embodiment, a karaoke device is disclosed including an enclosure with a voice pickup element integrated into the enclosure. The voice pickup element converts sound waves into an electrical signal. The karaoke device includes an audio input, an audio output and a switch. An input of an amplifier is connected to the electrical signal. A first input of a mixer is connected to an output of the amplifier and a second input of the mixer is connected to the audio input. A first position of the switch connects the audio input to the audio output and a second position of the switch connects an output of the mixer to the audio output.

In another embodiment, a karaoke device is disclosed including an enclosure in the shape of a hand-held microphone with a voice pickup element integrated within the enclosure. An input of an amplifier within the enclosure is connected to the voice pickup element. The karaoke device has a left audio input, a left audio output, a right audio input, and a right audio output. An input of an amplifier within the enclosure is connected to the electrical signal. A first input of a first mixer is connected to an output of the amplifier and a second input of the first mixer connected to the left audio input. A first input of the second mixer connected to an output of the amplifier and a second input of the second mixer connected to the right audio input. The first and second mixers are housed within the enclosure. A first position of a switch connects the left audio input to the left audio output and connects the right audio input to the right audio output. A second position of the switch connects an output of the first mixer to the left audio output and connects an output of the second mixer to the right audio output.

In another embodiment, a karaoke device is disclosed including a wireless microphone having a voice pickup element, a modulator and an antenna. The voice pickup converts sound waves into an electrical signal and the modulator modulates the electrical signal onto a wireless signal that is emitted by the antenna. The karaoke device includes an enclosure having an audio input, an audio output and a second antenna. A receiver within the enclosure is connected to the second antenna. The receiver detects the wireless signal and demodulates the electrical signal. An amplifier within the enclosure is connected to an output of the receiver. A mixer within the enclosure has a first input connected to an output of the amplifier and a second input connected to the audio input. A first position of a switch connects the audio input to the audio output and a second position of the switch connects an output of the mixer to the audio output.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
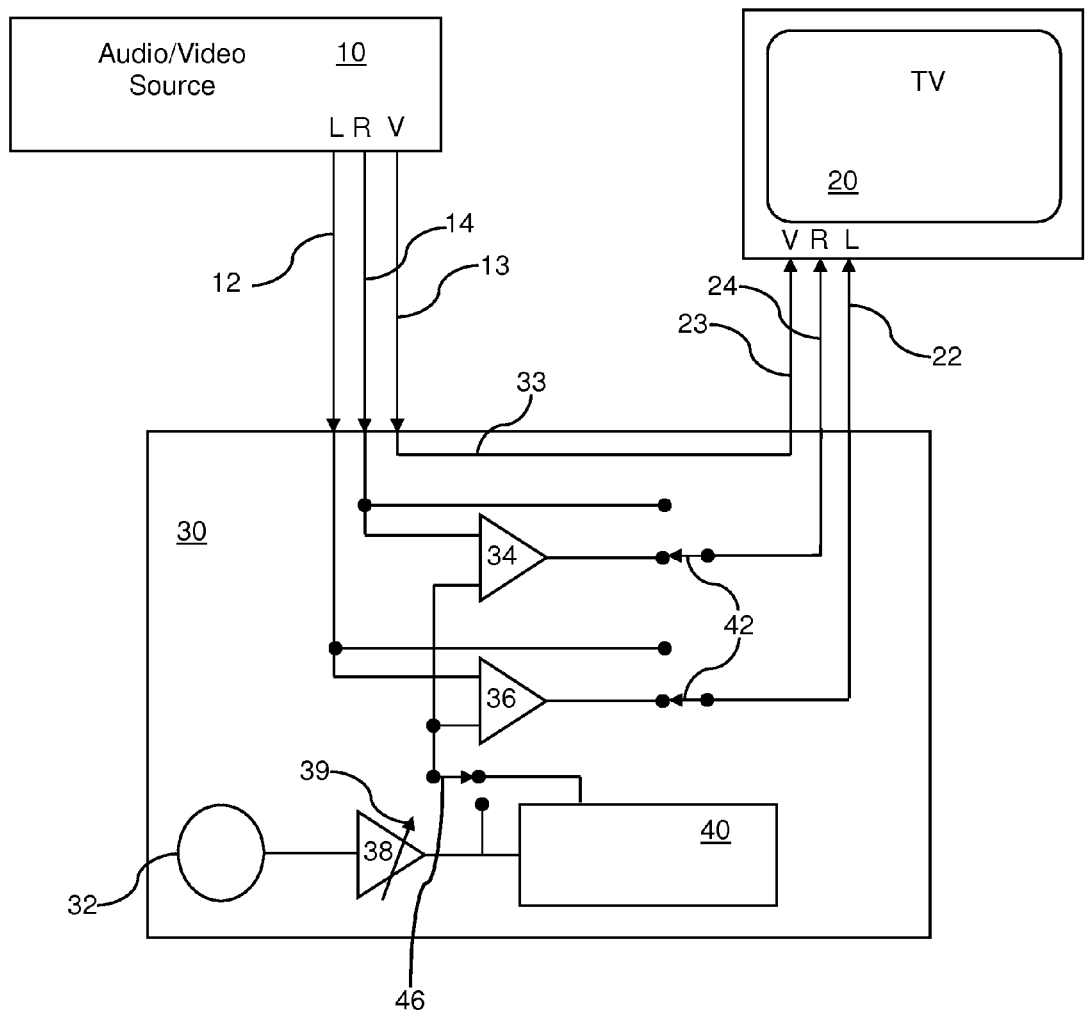
FIG. 1 illustrates a block diagram of a system of a first embodiment of the present invention.

Reference will now be made in detail to the presently preferred embodiments of the invention, examples of which are illustrated in the accompanying drawings. Throughout the following detailed description, the same reference numerals refer to the same elements in all figures. In the following description, many different audio/video sources are possible, including a DVD player. In most examples, the source is capable of outputting karaoke content (e.g., music with suppressed vocal tracks, lyrics and video). In the examples shown, a television (TV) is used as an example of an output device that includes sound amplification and reproduction as well as video display. There are many other content sources such as personal computers, CD players, MP3 players, tape players, laser disc players, and the present invention is not limited in any way. There are many other output devices that include sound amplification and reproduction as well as a display, either in an integrated package or in individual components. Examples of such are stereo systems, monitors, personal computers, etc.

For simplicity, the block diagrams exclude a source of operating power. Power supplies including batteries and transformers are well known in the industry.

Referring to FIG. 1, a block diagram of a system of a first embodiment of the present invention is shown. In this example, an audio/video source 10 is connected directly to the karaoke device 30. The left audio output 12 conductors, right audio output conductors 14 and the video output conductors 13 from the audio/video source 10 are connected to the karaoke device 30. In some embodiments, the conductors 12/13/14 are terminated with RCA phono plugs for plugging into standard audio output jacks included on audio/video sources 10 such as DVD players. In other embodiments, the conductors 12/13/14 are terminated by a 3.5 mm phone jack for plugging into most standard audio output jacks included on music/video players such as the iPod from Apple, Inc. Such 3.5 mm phone jacks include contacts for left-audio, right-audio, video and ground.

The karaoke device 30 is hand-held and is preferably shaped similar to a standard microphone. A voice pick-up element 32 is situated on an outer surface of the karaoke device 30 in a location where it can receive sound waves corresponding to the user's voice. The voice pick-up element converts the sound waves into an electrical signal that is connected to an amplifier 38 that adjustably 39 amplifies the user's voice to a level compatible with the audio outputs 12/14 from the audio/video source 10. In the preferred embodiment, the amplifier's output is adjusted by a multi-position switch connected to a resistor ladder. In other embodiments, the amplifier's output is adjusted with a potentiometer or a digital potentiometer having a volume-up and a volume-down push button switch. For most audio sources, the audio output level is usually around 1 volt, peak-to-peak.

The audio output signal from the adjustable amplifier 38 interfaces to a selector switch 46 and to a sound processor 40. The sound processor 40 enhances the user's voice by adding, for example, echo. The selector switch 46 lets the user select either audio from the voice pick-up element 32 or from the sound processor 40. In some embodiments, the selector switch is integrated into an on/off power switch (not shown) having three positions such as off, on and on/echo.

The audio output from the selector switch is mixed with the left input 12 by amplifier 36 producing a mixed left audio signal and with the right input 14 by amplifier 34 producing a mixed right audio signal. The outputs of the amplifiers 34/36 pass to another selector switch 42 that selects to either pass the left 12 and right 14 audio from the audio/video source 10 directly to the outputs or pass the mixed audio to the outputs. The audio output conductors of the karaoke device 30 pass on cables 22/24 to the television 20. It is preferred to terminate the end of the conductors 22/24 with RCA phono jacks for compatibility with most televisions.

The video output conductor 13 from the audio/video source 10 is routed internally 33 and passes out to the video output conductor 23 to the video input of the television 20. In some embodiments, the output conductors 22/23/24 are bundled into one cable while in other embodiments, the output conductors 22/23/24 are individual cables. In some embodiments, the output conductors 22/23/24 are connected directly to the karaoke device 30 while in other embodiments, the output conductors 22/23/24 are removably connected to the karaoke device with a connector (not shown).

Figure 2:
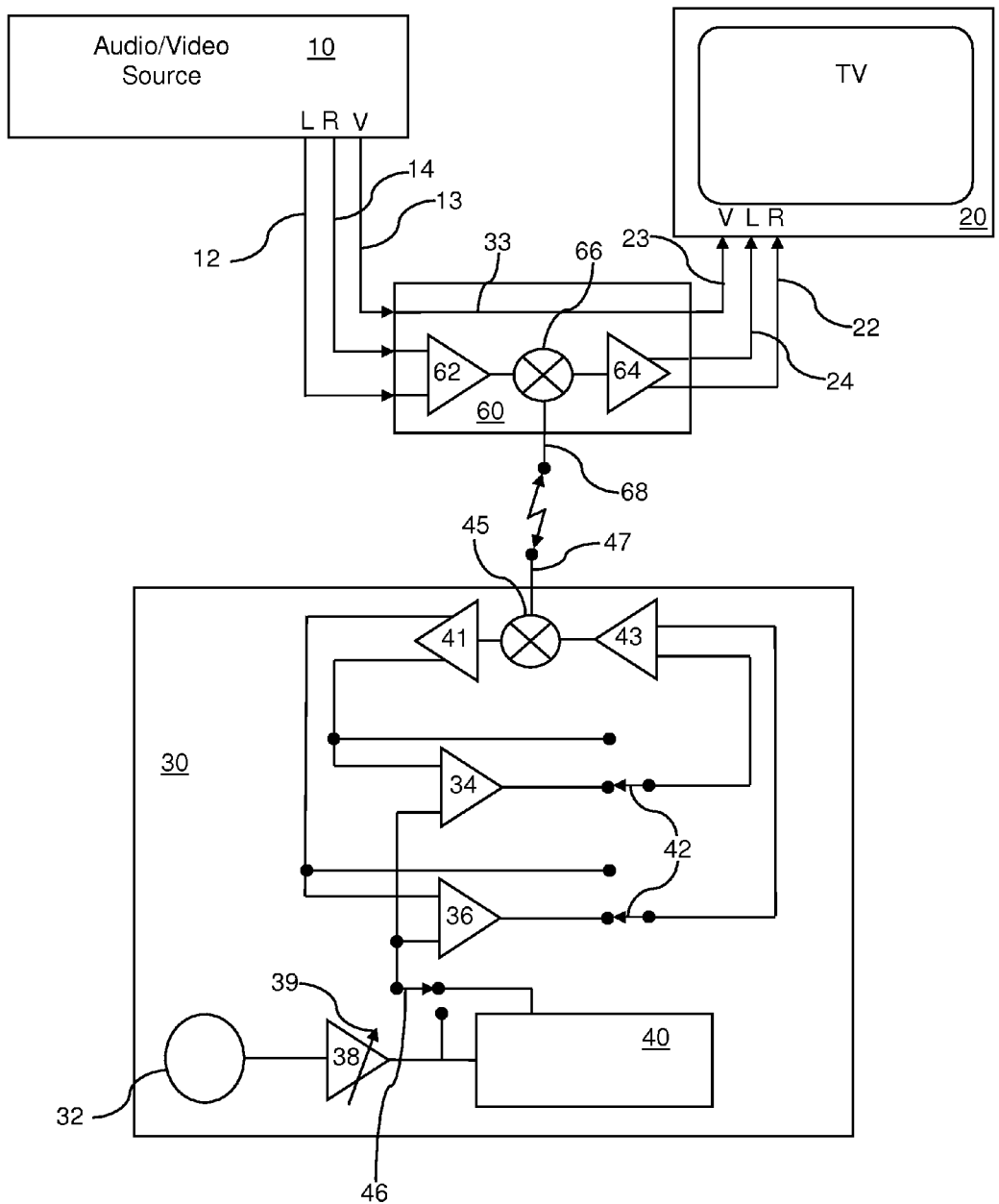
FIG. 2 illustrates a block diagram of a system of a second embodiment of the present invention.

Referring to FIG. 2 illustrates a block diagram of a system of a second embodiment of the present invention is shown. In this example, an audio/video source 10 is connected directly to an audio transceiver 60. The left audio output 12 conductor, right audio output conductor 14 and the video output conductor 13 from the audio/video source 10 are connected to the audio transceiver 60. In some embodiments, the conductors 12/13/14 are terminated with RCA phono plugs for plugging into standard audio output jacks included on audio/video sources 10 such as DVD players. In other embodiments, the conductors 12/13/14 are terminated by a 3.5 mm phone jack for plugging into most standard audio output jacks included on music/video players such as the iPod from Apple, Inc.

The audio transceiver 60 has a modulator 62 (either analog or digital modulation) that modulates the left and right audio onto a wireless carrier such as a radio frequency or an infrared light frequency. Many methods of modulation such as Amplitude Modulation (AM), Frequency Modulation (FM) and Quadrature Modulation (QAM) are known in the industry and any can be used without veering from the present invention. In the example shown, the audio signals are modulated onto an RF signal that passes through an antenna mixer 66 to an antenna 68 where the modulated RF signal radiates and is picked up by an antenna 47 on the karaoke device 30.

The karaoke device 30 is hand-held and preferably shaped similar to a standard microphone. The modulated audio signal from the antenna 47 passes through an antenna mixer 45 and is demodulated by a demodulator 41 into left and right audio signals representative of the left 12 and right 14 audio signals from the audio/video source 10. A voice pick-up element 32 is situated on an outer surface of the karaoke device 30 in a location where it can receive sound waves corresponding to the user's voice. The voice pick-up element is connected to an amplifier 38 that adjustably 39 amplifies the user's voice to a level compatible with the audio outputs 12/14 from the demodulator 41. In the preferred embodiment, the amplifier's output is adjusted by a multi-position switch connected to a resistor ladder. In other embodiments, the amplifier's output is adjusted with a potentiometer or a digital potentiometer having a volume-up and a volume-down push button switch. For most audio sources, the audio output level is usually around 1 volt, peak-to-peak.

The audio output signal from the adjustable amplifier 38 interfaces to a selector switch 46 and a sound processor 40. The sound processor 40 enhances the user's voice by adding, for example, echo. The selector switch 46 lets the user select either audio directly from the voice pick-up element 32 or from the sound processor 40. In some embodiments, the selector switch is integrated into an on/off power switch (not shown) having three positions such as off, on and on/echo.

The audio output from the selector switch is mixed with the left input by amplifier 36 and with the right input by amplifier 34. The outputs of the amplifiers 34/36 pass to another selector switch 42 that selects to either pass the left and right audio from the audio/video source 10 to the outputs or pass the mixed audio to the outputs. The outputs of the karaoke device 30 are modulated in a similar way to the modulator in the audio transceiver 60 modulator 62 by another modulator 43. The modulated signal passes through the antenna mixer 45 and is radiated by the antenna 47. The radiated modulated audio signals are received by the audio transceiver's 60 antenna 68 and pass through the antenna mixer 66 and are demodulated by a demodulator 64. The audio output of the demodulator 64 passes on conductors 22/24 to the television 20. Again, it is preferred terminate the conductors 22/24 with RCA phono jacks for compatibility with most televisions.

The video output conductor 13 from the audio/video source 10 is routed internally 33 and passes out on the video output conductor 23 and to the video input of the television 20. In some embodiments, the output conductors 22/23/24 are bundled into one cable while in other embodiments, the output conductors 22/23/24 are individual cables. In some embodiments, the output conductors 22/23/24 are connected directly to the audio transceiver 60 while in other embodiments, the output conductors 22/23/24 are removably connected to the base station karaoke device 60 with a connector (not shown).

Figure 3:
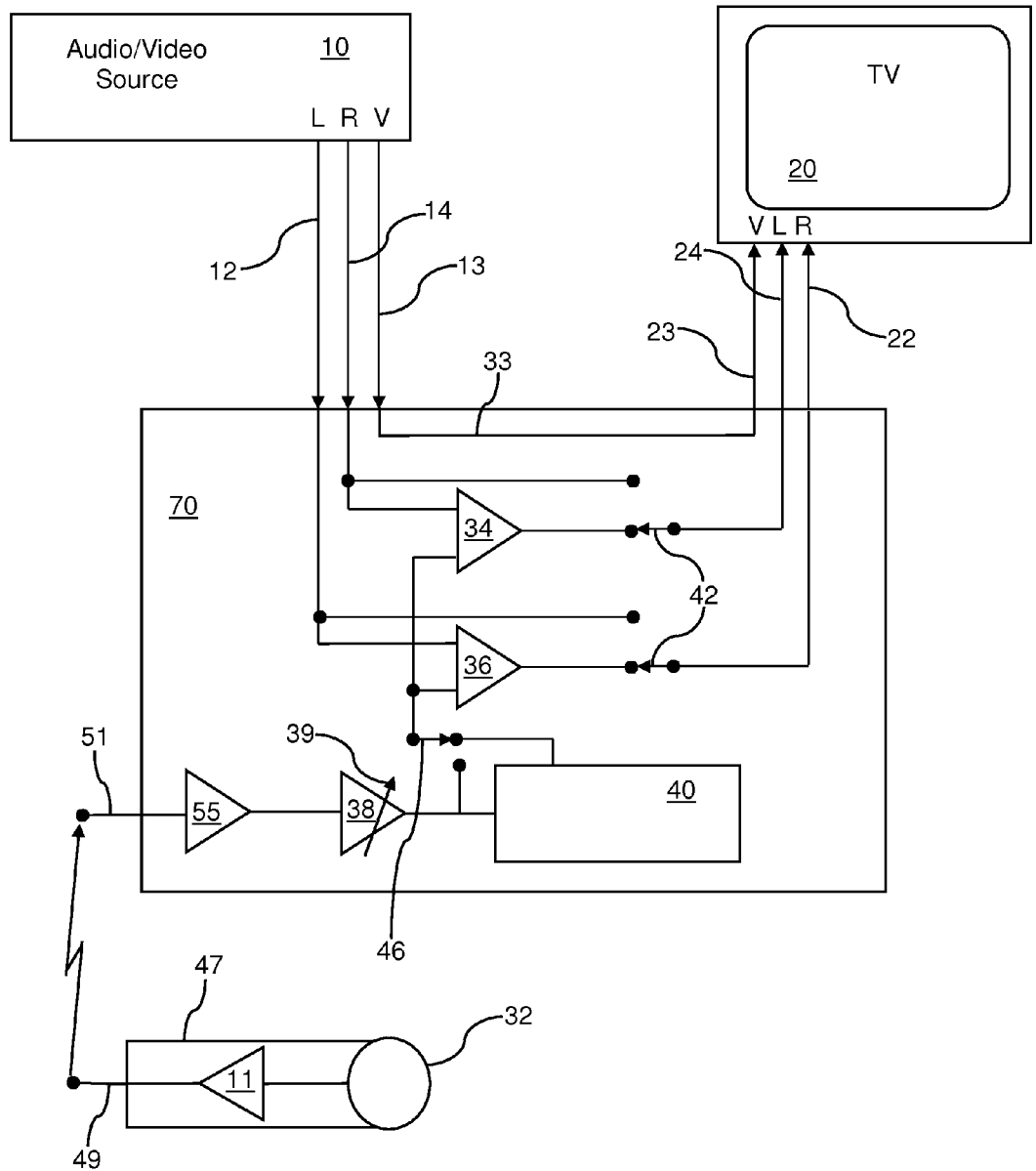
FIG. 3 illustrates a block diagram of a system of a third embodiment of the present invention.

Referring to FIG. 3, a block diagram of a system of a third embodiment of the present invention is shown. In this example, an audio/video source 10 is connected directly to a karaoke system 70. The left audio output 12 conductor, right audio output conductor 14 and the video output conductor 13 from the audio/video source 10 are connected to the karaoke device 70. In some embodiments, the conductors 12/13/14 are terminated with RCA phono plugs for plugging into standard audio output jacks included on audio/video sources 10 such as DVD players. In other embodiments, the conductors 12/13/14 are terminated by a 3.5 mm phone jack for plugging into most standard audio output jacks included on music/video players such as the iPod from Apple, Inc. The base station karaoke device 70 is housed within an enclosure that can be located near the user's audio/video source 10 and television 20.

A voice pick-up element 32 is situated on an outer surface of a wireless microphone 47 in a location where it can receive sound waves corresponding to the user's voice. The voice pick-up element converts the sound waves into an electrical signal that is connected to an amplifier and modulator 11 that amplifies the user's voice and modulates the audio signal onto a wireless signal (e.g., Radio Frequency or Infrared), emitting the wireless signal on an external antenna 49 or IR transducer (not shown). As discussed previously, any known method of modulation can be used to wirelessly send the user's voice (audio) to the base station karaoke device 70.

The wireless signal is picked up by a matching antenna (or IR transducer) 51 at the base station karaoke device 70 and demodulated by a demodulator 55 producing an electrical audio signal similar to the user's voice. This electrical signal is amplified by an amplifier 38 with volume control 39 to a level compatible with the audio outputs 12/14 from the Audio/video source 10. In the preferred embodiment, the amplifier's output (volume) is adjusted by a multi-position switch connected to a resistor ladder. In other embodiments, the amplifier's output is adjusted with a potentiometer or a digital potentiometer having a volume-up and a volume-down push button switch. For most DVD players, the audio output level is usually around 1 volt, peak-to-peak.

The audio output signal from the adjustable amplifier 38 interfaces to a selector switch 46 and a sound processor 40. The sound processor 40 enhances the user's voice by adding, for example, echo. The selector switch 46 lets the user select either audio from the voice pick-up element 32 or from the sound processor 40. In some embodiments, the selector switch is integrated into an on/off power switch (not shown) having three positions such as off, on and on/echo.

The audio output from the selector switch is mixed with the left input by amplifier 36 and with the right input by amplifier 34. The outputs of the amplifiers 34/36 pass to another selector switch 42 that selects to either pass the left and right audio from the audio/video source 10 directly to the outputs or pass the mixed audio to the outputs. The outputs of the base station karaoke device 70 pass on conductors 22/24 to the television 20. Again, it is preferred to terminate the ends of the conductors 22/24 with RCA phono jacks for compatibility with most televisions.

The video output conductor 13 from the audio/video source 10 is routed internally 33 through the base station karaoke device 70 and passed through the enclosure to video output conductor 23 and to the video input of the television 20. In some embodiments, the output conductors 22/23/24 are bundled into one cable while in other embodiments, the output conductors 22/23/24 are individual cables. In some embodiments, the output conductors 22/23/24 are connected directly to the base station karaoke device 70 while in other embodiments, the output conductors 22/23/24 are removably connected to the base station karaoke device 70 with a connector (not shown).

Figure 4:
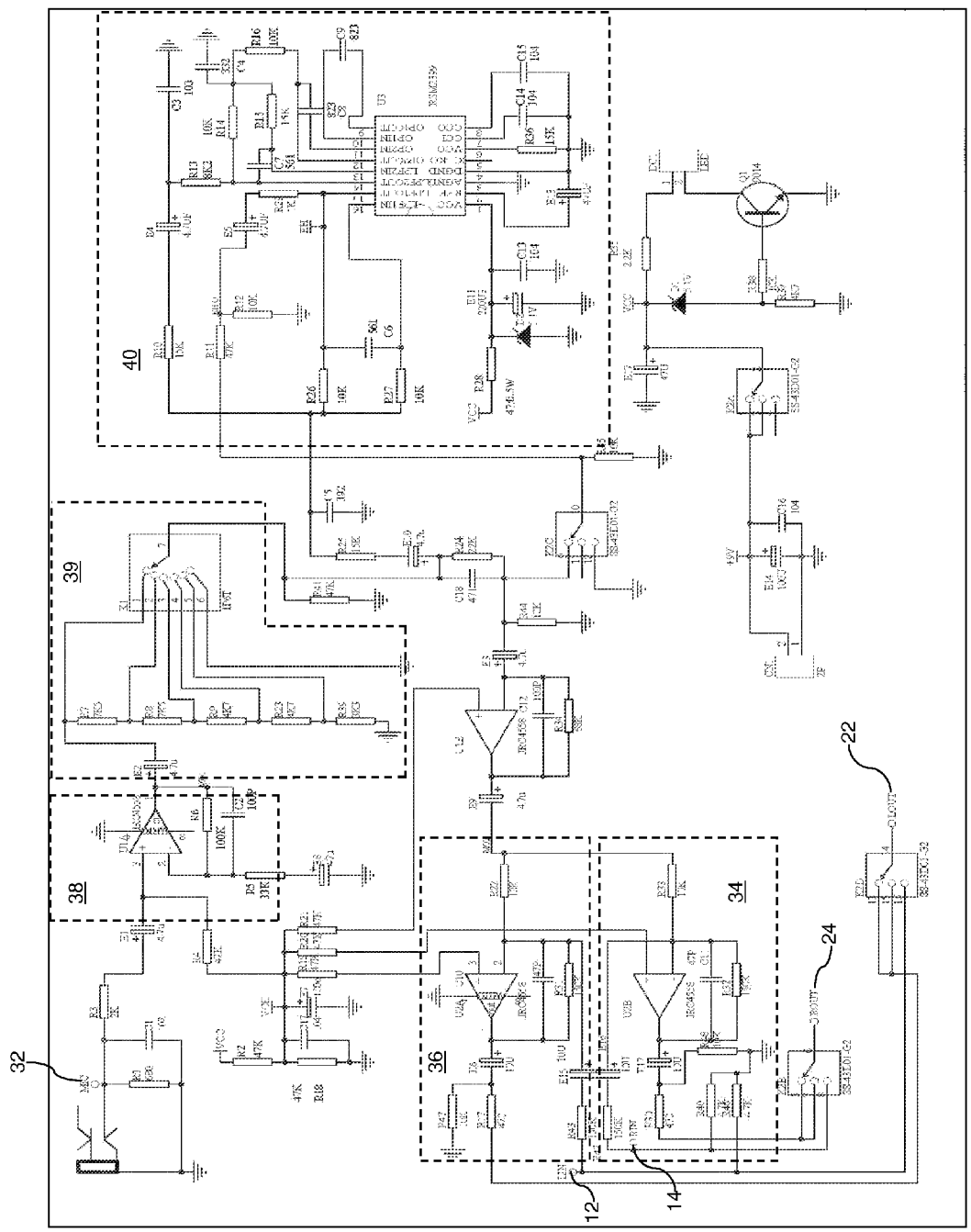
FIG. 4 illustrates a schematic diagram of the first embodiment of the present invention.

Referring to FIG. 4, a schematic diagram of a system of a first embodiment of the present invention is shown. In this exemplary design, the voice pick-up element or microphone 32 is connected to an amplifier 38 that amplifies the user's voice to a level compatible with the audio outputs 12/14 from the Audio/video source 10. In this exemplary design, the amplifier's 38 output is adjusted by a multi-position switch K1 39 connected to a resistor ladder (R7, R8, R9, R23, R39).

The audio output signal from the amplifier 38 interfaces to a selector switch (K2) and a sound processor 40. The sound processor 40 enhances the user's voice by adding echo processing. The selector switch (K2C) lets the user select either audio directly from the amplifier 38 (e.g., the voice from the microphone 32) or the processed audio from the sound processor 40. In this exemplary design, the selector switch is integrated into an on/off power (K2A) switch having three positions: off, on and on/echo.

The audio output from the selector switch is mixed with the left input 12 by amplifier 36 and with the right input by amplifier 34. The outputs of the amplifiers 34/36 pass to another selector switch (K2B and K2D) that selects to either pass the left and right audio from the left and right inputs 12/14 directly to the outputs 22/24 or pass the mixed audio to the outputs 22/24.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:
1. A karaoke device comprising:
a handheld enclosure in the shape of a hand-held microphone;

a voice pickup element integrated into the handheld enclosure;

an amplifier within the handheld enclosure, an input of the amplifier connected to the voice pickup element;

a left audio input on the handheld enclosure;

a left audio output on the handheld enclosure;

a right audio input on the handheld enclosure;

a right audio output on the handheld enclosure;

an amplifier within the handheld enclosure, an input of the amplifier connected to the electrical signal;

a first mixer within the handheld enclosure, a first input of the first mixer connected to an output of the amplifier and a second input of the first mixer connected to the left audio input;

a second mixer within the handheld enclosure, a first input of the second mixer connected to an output of the amplifier and a second input of the second mixer connected to the right audio input;

a switch interfaced to the handheld enclosure and having at least two positions, a first position of the switch connecting the left audio input to the left audio output and connecting the right audio input to the right audio output, a second position of the switch connecting an output of the first mixer to the left audio output and connecting an output of the second mixer to the right audio output;

a sound processor within the handheld enclosure, an input of the sound processor connected to the output of the amplifier; and the second position of the switch connects the first input of the first mixer and the first input of the second mixer to the output of the amplifier and a third position of the switch connects the first input of the first mixer and the first input of the second mixer to an output of the sound processor.

2. The karaoke device of claim 1, wherein the amplifier further comprises a volume control.

3. The karaoke device of claim 1, whereas the first position of the switch also disconnects power to the amplifier and the mixer; and the second and third position of the switch connects power to the amplifier and the mixer.

4. A karaoke device comprising:

a wireless microphone having a voice pickup element, a modulator and an antenna interfaced to a handheld enclosure, the voice pickup converts sound waves into an electrical signal, the modulator modulates the electrical signal onto a wireless signal that is emitted by the antenna;

an enclosure;

an audio input on the enclosure;

an audio output on the enclosure;

a second antenna integrated with the enclosure;

a receiver within the enclosure, the receiver connected to the second antenna, the receiver detecting the wireless signal and demodulating the electrical signal;

an amplifier within the enclosure, an input of the amplifier connected to an output of the receiver;

a mixer within the enclosure, a first input of the mixer connected to an output of the amplifier and a second input of the mixer connected to the audio input;

a switch having at least two positions, a first position of the switch connecting the audio input to the audio output and a second position of the switch connecting an output of the mixer to the audio output;

a sound processor within the enclosure, an input of the sound processor connected to the output of the amplifier; and the second position of the switch connecting the first input of the mixer to the output of the amplifier and a third position of the switch connecting the first input of the mixer to an output of the sound processor.

5. The karaoke device of claim 4, wherein the electronic circuit further comprises a circuit for controlling an amplitude of the amplified electric signal.

6. The karaoke device of claim 4, wherein the audio input is connected to at least one of a left output and a right output of a music/video player and the audio output is connected to at least one of a left audio input and a right audio input of a television.

7. The karaoke device of claim 4, whereas the first position of the switch also disconnects power to the amplifier and the mixer; and the second position and the third position of the switch connects power to the amplifier and the mixer.

8. The karaoke device of claim 4, wherein the antenna is integrated within the handheld enclosure and the second antenna is integrated within the enclosure.

* * * * *